US006550820B2

(12) United States Patent
Baerts et al.

(10) Patent No.: US 6,550,820 B2
(45) Date of Patent: Apr. 22, 2003

(54) CONNECTION ARRANGEMENT FOR A MINERAL-INSULATED CONDUIT

(75) Inventors: Christiaan Baerts, Beringen-Paal (BE); Peter van Gerwen, Hever (BE); Jean-Paul Jaenen, Genk (BE)

(73) Assignee: EPIQ Sensor Nite, N.V., Leuven (BE)

( * ) Notice: Subject to any disclaimer, the term of this patent is extended or adjusted under 35 U.S.C. 154(b) by 0 days.

(21) Appl. No.: 09/731,567

(22) Filed: Dec. 7, 2000

(65) Prior Publication Data

US 2001/0002756 A1 Jun. 7, 2001

(30) Foreign Application Priority Data

Dec. 7, 1999 (DE) ........................................ 199 58 762

(51) Int. Cl.[7] ................................................ F16L 13/02

(52) U.S. Cl. ............................... 285/288.1; 285/288.9; 285/330; 285/328

(58) Field of Search .......................... 285/288.1, 288.8, 285/288.9, 397, 328, 330

(56) References Cited

U.S. PATENT DOCUMENTS 3,364,303 A * 1/1968 Zaleski ........................ 174/76
4,221,457 A * 9/1980 Allen et al. ............. 339/275 R
5,161,894 A * 11/1992 Bourigault .................. 374/185
5,301,213 A * 4/1994 Linden et al. .............. 376/260
5,571,394 A * 11/1996 Hettiarachi et al. ......... 204/400
5,973,502 A * 10/1999 Baileul et al. .............. 325/690
6,158,268 A * 12/2000 Hafele et al. .............. 73/31.05
6,229,093 B1 * 5/2001 Hafele .................... 147/122 G
6,357,284 B1 * 3/2002 Kim et al. ..................... 73/86

FOREIGN PATENT DOCUMENTS

DE 195 41 218 A1 5/1997
DE 198 08 030 A1 9/1998
DE 295 22 062 U1 8/1999
DE 19819283 * 10/1999
WO WO 95/18965 7/1995

* cited by examiner

*Primary Examiner*—Eric K. Nicholson
*Assistant Examiner*—Giovanna M Collins
(74) *Attorney, Agent, or Firm*—Akin Gump Strauss Hauer & Feld, L.L.P.

(57) ABSTRACT

A connection arrangement is provided for a mineral-insulated conduit with two ends to at least one tube-shaped structure, wherein at least one end is arranged partially overlapping with a tube-shaped structure and is affixed by welding or soldering, and wherein a sheath surface is arranged in the region of the overlap. The problem results of making available a connection arrangement for a mineral-insulated conduit to a tube-shaped structure, which is simple to produce and mechanically stable. The problem is solved in that the sheath surface has a structured surface, the end of the mineral-insulated conduit and the tube-shaped structure contact each other on all sides in the region of the overlap, and the contact surface is smaller than the sheath surface beyond the contact surface.

12 Claims, 7 Drawing Sheets

Section

B - B'

C - C'

D - D'

E - E'

CONNECTION ARRANGEMENT FOR A MINERAL-INSULATED CONDUIT

BACKGROUND OF THE INVENTION

The invention relates to a connection arrangement for a mineral-insulated conduit to at least one tube-shaped structure, wherein at least one end of the two ends of the mineral-insulated conduit is arranged partially overlapping with a tube-shaped structure and is affixed by welding or soldering.

Connection arrangements of this type are known, in particular for sensors in the sector of exhaust gas conduction of a motor vehicle.

WO 95/18965 describes a measuring probe with a metallic housing and a sensor chip arranged in it, which has a sensor element. The sensor chip is connected to the electrical conductors of a mineral-insulated metal sheathed cable. The housing is connected to the metal sheathed cable via a jack, which is set on the metal sheathed conduit and is bonded to it by laser welding. The housing and the jack are likewise bonded by laser welding.

In order to produce the laser weld connections between the metal sheathed cable and the jack, as well as between the jack and housing, the respective parts to be connected must be adapted to each other in diameter. Such an adaptation is necessary in order to prevent air gaps between the parts, which generally makes the laser welding difficult. In addition, the weld connection constructed in this manner is susceptible to vibrations, which play a large role especially in motor vehicles. A break in the weld connection leads to a high mechanical stress on the electrical connection to the sensor chip and can lead to a failure of the sensor.

The problem results of making available a connection arrangement for a mineral-insulated conduit to a tube-shaped structure, which is simple to produce and which avoids the disadvantages of the prior art.

BRIEF SUMMARY OF THE INVENTION

The problem is solved in that a sheath surface in the region of the overlap has a raised structure, and the end of the mineral-insulated conduit and the tube-shaped structure contact each other on all sides in the region of the overlap, wherein the contact surface is smaller than the sheath surface.

A simple connection arrangement results with exceptional mechanical rigidity and high resistance against vibrations, which is especially excellently suited for a use according to the invention on sensors, which are installed in or on motor vehicles. On account of the structured sheath surface, in addition, a low heat conduction is to be established in the region of the connection arrangement. Thus, for example, using the connection arrangement, a sensor can be contacted, for use in hot gases, with a very short-dimensioned mineral-insulated conduit, which forms the transition to a connection sheath and a cable that can be only slightly thermally loaded, for example a cable with a plastic casing. A short connection constructed in this manner between the sensor and the cable is especially advantageous when only small installation dimensions are available, as is customary in a motor vehicle.

It is especially advantageous if the end of the mineral-insulated conduit is plugged into the tube-shaped structure. The tube-shaped structure can, for example, be a sensor housing or a connection sleeve for a flexible cable.

It has been proven worthwhile if the structured sheath surface is formed from the outer peripheral surface of the end of the mineral-insulated conduit. It is also possible, however, that the structured sheath surface be formed from the inner peripheral surface of the tube-shaped structure.

The structuring of the sheath surface herein can be made from a fluting. Suitable types of flutings include, for example, longitudinal flutings, transverse flutings, or point-flutings. However, a fluting which is constructed in a manner similar to a threading or as a diagonal fluting can also be used.

As a structure for a sheath surface, a wire or a wire mesh is suitable, which can be affixed.

According to an overlapping arrangement of a tube-shaped structure with a mineral-insulated conduit, wherein the structured sheath surface is arranged in the region of the overlap, the external periphery of the tube-shaped structure is reduced. Here, the structured sheath surface is deformed, and a form-fitting connection is produced between the tube-shaped structure and the mineral-insulated conduit. The parts thus fitted to each other are then additionally bonded by a laser welding.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

The mineral-insulated conduit, which is normally composed of at least one electrical conductor, a metallic sheathed tube and a mineral filling powder, is shown in FIGS. 1 to 6*b* only schematically without electrical conductor and without mineral filling powder.

DETAILED DESCRIPTION OF THE INVENTION

Figure 1:
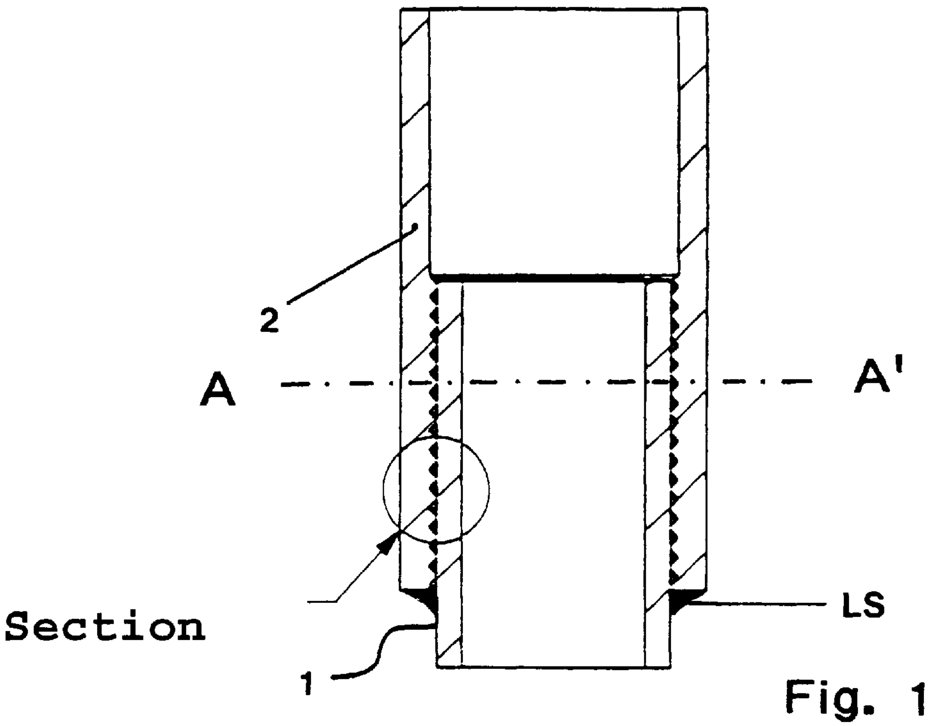
FIGS. 1, 1*a*, 1*b* are sectioned views of a connection arrangement according to the invention with mineral-insulated conduit and tube-shaped structure.

FIG. 1 shows a connection arrangement with a mineral-insulated conduit 1 and a tube-shaped structure 2. One end of the mineral-insulated conduit 1 is arranged overlapping with the tube-shaped structure 2 and plugged into it. The outer peripheral surface of the plugged-in end of the mineral-insulated conduit 1 can be formed with a structured sheath surface, while the inner peripheral surface of the tube-shaped structure 2 in the region of the overlap is formed smooth. However, the inner peripheral surface of the tube-shaped structure can instead be formed as a structured sheath surface, while the outer peripheral surface of the plugged-in end of the mineral-insulated conduit 1 is formed smooth. After the mineral-insulated conduit 1 and the tube-shaped structure 2 are overlappingly arranged, the outer periphery of the tube-shaped structure 2 is reduced in the region of the overlap, for example by pressing. The structured sheath surface is thereby deformed, and a form-fitting bond is produced between the tube-shaped structure 2 and the mineral-insulated conduit 1. Then, the tube-shaped structure 2 and the mineral-insulated conduit 1 are bonded by formation of a laser weld joint LS.

Figure 1A:
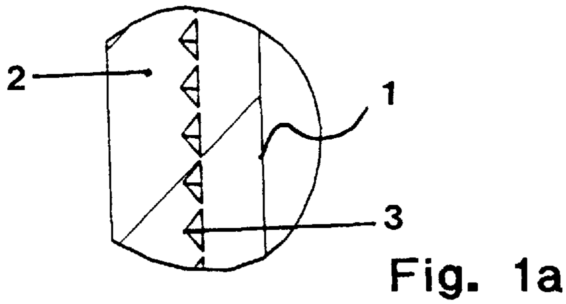

FIG. 1*a* shows a section from FIG. 1 in the region of the structured sheath surface with a fluting 3.

Figure 1B:
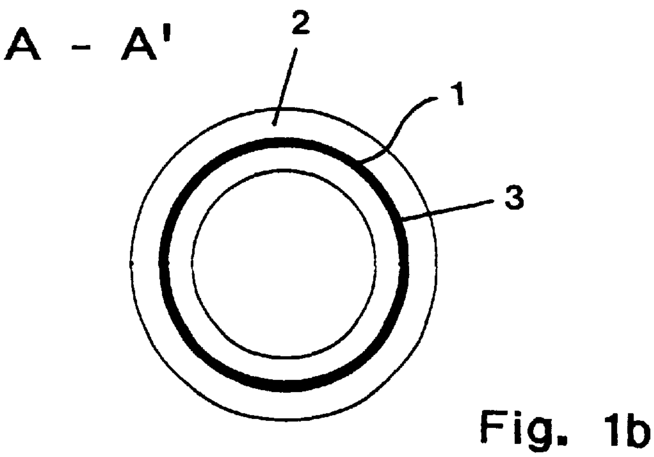

FIG. 1*b* shows the cross-section A–A' of the mineral-insulated conduit 1 from FIG. 1 with the tube-shaped structure 2, the mineral-insulated conduit 1 and the fluting 3.

Figure 2:
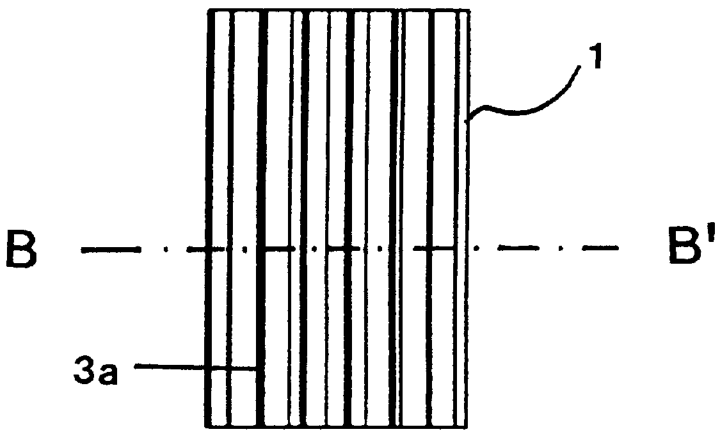
FIGS. 2, 2*a*, 2*b* are side, perspective and sectioned views, respectively, of a mineral-insulated conduit according to the invention with a structured sheath surface with longitudinal fluting.

FIG. 2 shows schematically a piece of a mineral-insulated conduit 1 with a longitudinal fluting 3*a* on its outer peripheral surface.

Figure 2A:
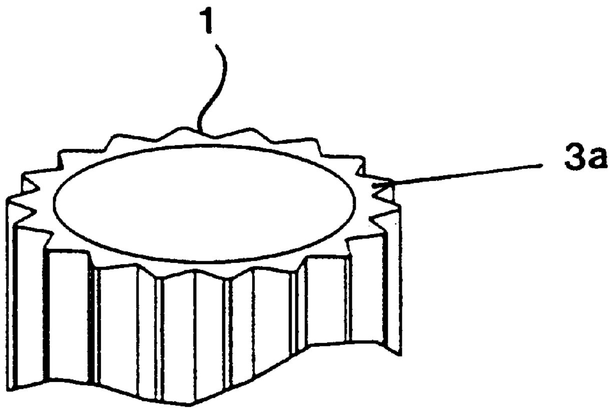

FIG. 2*a* shows the mineral-insulated conduit 1 with the longitudinal fluting 3*a* from FIG. 2 in a perspective view.

Figure 2B:
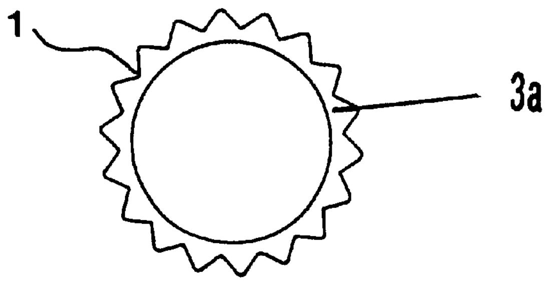

FIG. 2*b* shows the cross-section B–B' of the mineral-insulated conduit 1 from FIG. 2 with the longitudinal fluting 3*a*.

Figure 3:
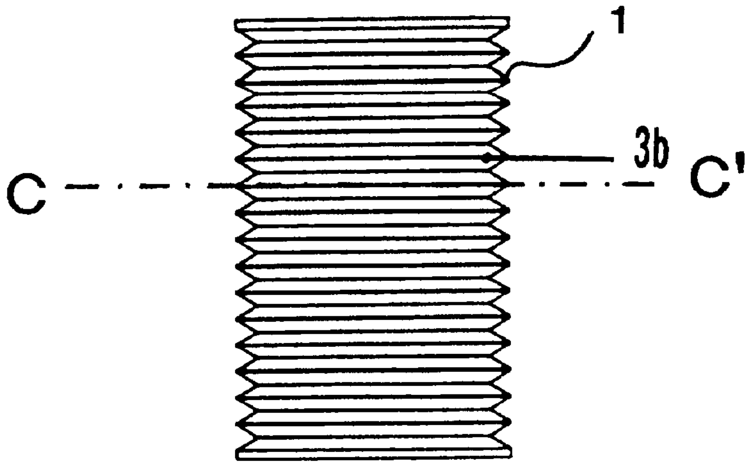
FIGS. 3, 3*a*, 3*b* are side, perspective and sectioned views, respectively, of a mineral-insulated conduit according to the invention with a structured sheath surface with transverse fluting.

FIG. 3 shows schematically a piece of a mineral-insulated conduit 1 with a transverse fluting 3*b* on its outer peripheral surface.

Figure 3A:
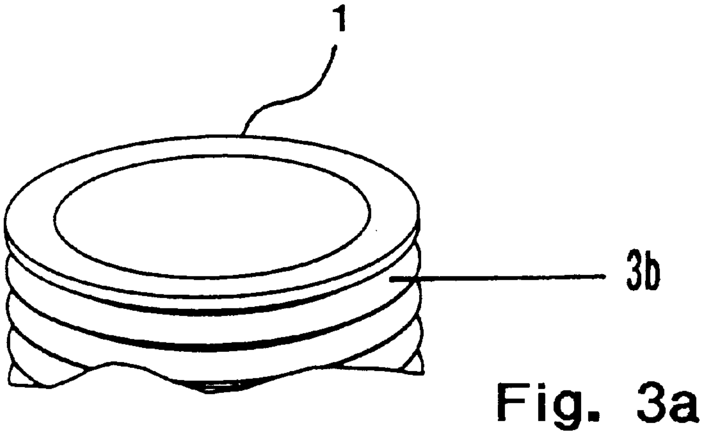

FIG. 3*a* shows the mineral-insulated conduit 1 with the transverse fluting 3*b* from FIG. 3 in a perspective view.

Figure 3B:
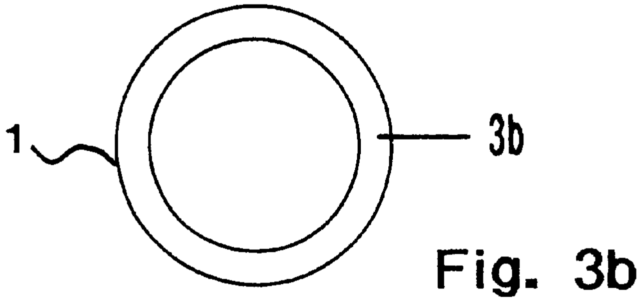

FIG. 3*b* shows the cross-section C–C' of the mineral-insulated conduit 1 from FIG. 3 with the transverse fluting 3*a*.

Figure 4:
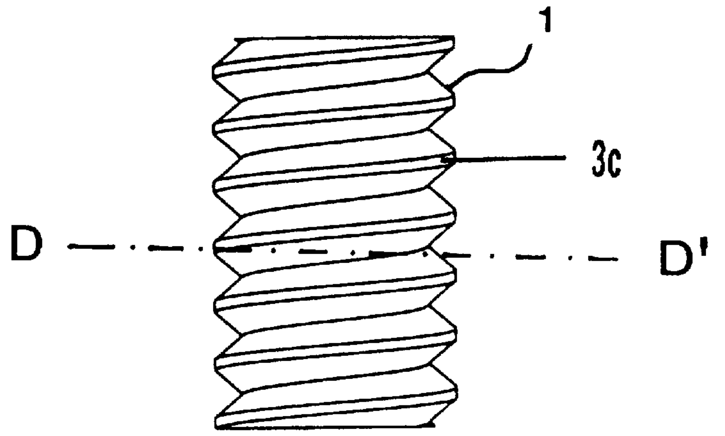
FIGS. 4, 4*a*, 4*b* are side, perspective and sectioned views, respectively, of a mineral-insulated conduit according to the invention with structured sheath surface with diagonal fluting.

FIG. 4 shows schematically a piece of a mineral-insulated conduit 1 with a diagonal fluting 3*c* on its outer peripheral surface.

Figure 4A:
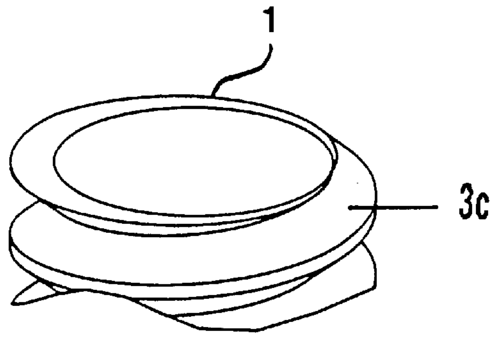

FIG. 4*a* shows the mineral-insulated conduit 1 with the diagonal fluting 3*c* from FIG. 4 in a perspective view.

Figure 4B:
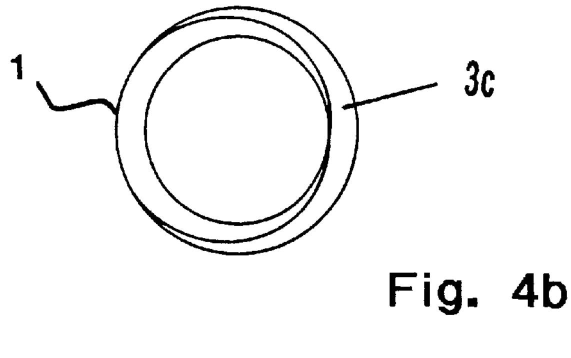

FIG. 4*b* shows the cross-section D–D' of the mineral-insulated conduit 1 from FIG. 4 with the diagonal fluting 3*c*.

Figure 5:
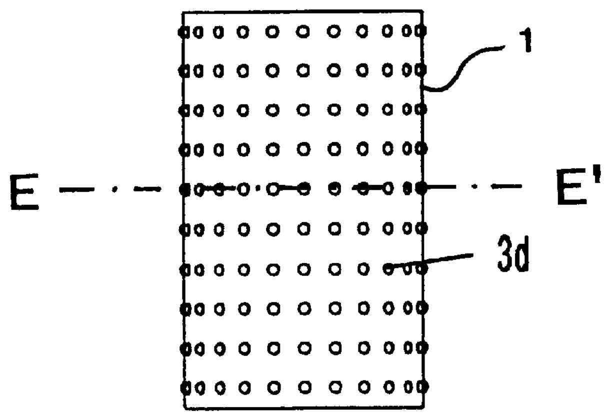
FIGS. 5, 5*a*, 5*b* are side, perspective and sectioned views, respectively, of a mineral-insulated conduit according to the invention with structured sheath surface with a point-shaped fluting.

FIG. 5 shows schematically a piece of a mineral-insulated conduit 1 with a point-shaped fluting 3*d* on its outer peripheral surface.

Figure 5A:
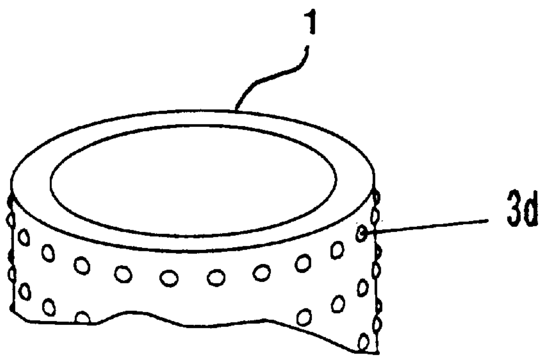

FIG. 5*a* shows the mineral-insulated conduit 1 with the point-shaped fluting 3*d* from FIG. 5 in a perspective view.

Figure 5B:
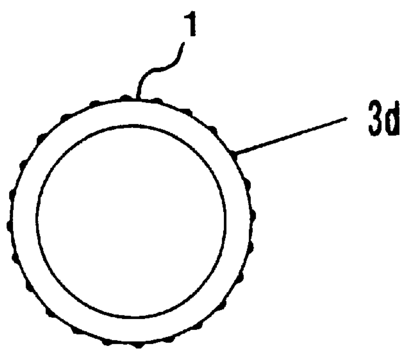

FIG. 5*b* shows the cross-section E–E' of the mineral-insulated conduit 1 from FIG. 5 with the point-shaped fluting 3*d*.

Figure 6:
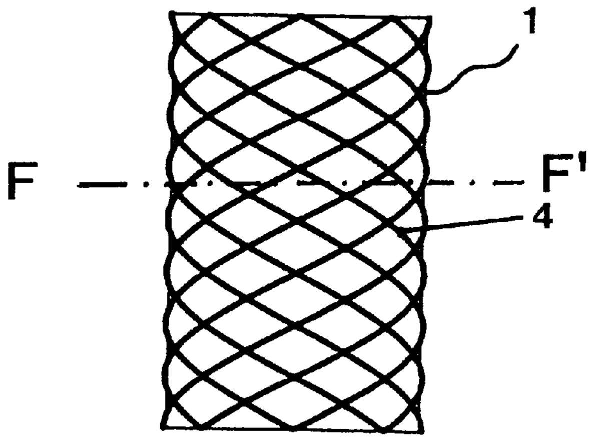
FIGS. 6, 6*a*, 6*b* are side, perspective and sectioned views, respectively, of a mineral-insulated conduit according to the invention with a structured sheath surface with a wire mesh.

FIG. 6 shows schematically a piece of a mineral-insulated conduit 1 with a wire mesh 4 on its outer peripheral surface.

Figure 6A:
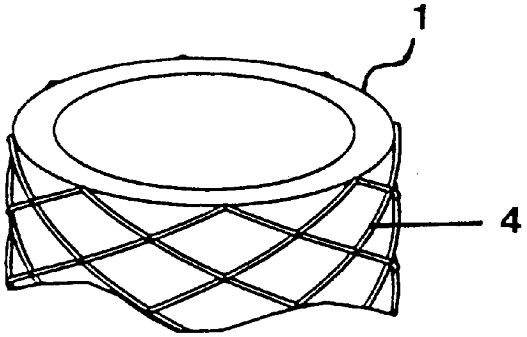

FIG. 6*a* shows the mineral-insulated conduit 1 with the wire mesh 4 from FIG. 6 in a perspective view.

Figure 6B:
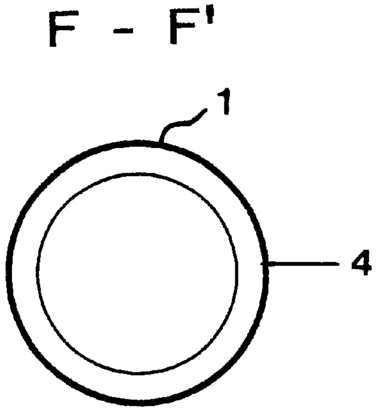

FIG. 6*b* shows the cross-section F–F' of the mineral-insulated conduit 1 from FIG. 6 with the wire mesh 4.

Figure 7:
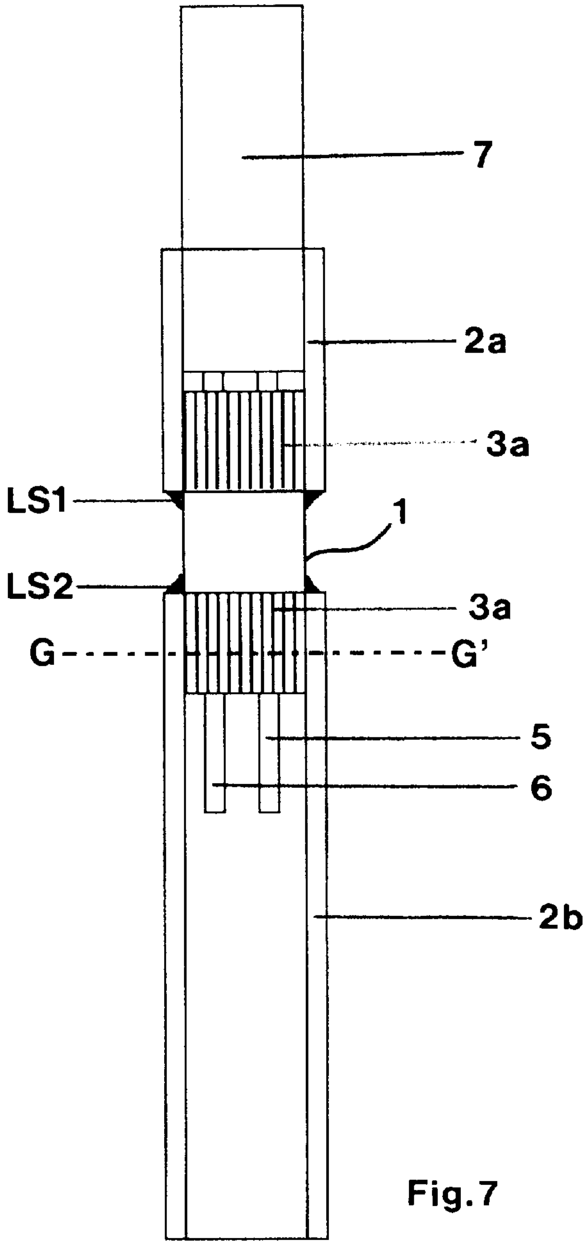
FIGS. 7, 7*a* are sectioned views of a connection arrangement according to the invention with sensor housing and connection sleeve.

FIG. 7 shows a connection arrangement with a mineral-insulated conduit 1, which has two electrical conductors 5, 6 and which has on each of its two ends a longitudinal fluting 3*a*. The one end of the mineral-insulated conduit 1 in the region of the fluting 3*a* is arranged overlapping with a connection sheath 2*a*, which forms the transition to a cable 7 which can only be slightly thermally loaded. The connection sleeve 2*a* is pressed onto the mineral-insulated conduit in the region of the fluting 3*a*. A subsequently produced laser weld joint LS1 bonds the connection sleeve 2*a* to the mineral-insulated conduit 1. The other end of the mineral-insulated conduit 1 in the region of the fluting 3*a* is arranged overlapping with a sensor housing 2*b*. The sensor housing 2*b* is pressed onto the mineral-insulated conduit in the region of the fluting 3*a*. A subsequently produced laser weld joint LS2 bonds the sensor housing 2*b* to the mineral-insulated conduit 1.

Figure 7A:
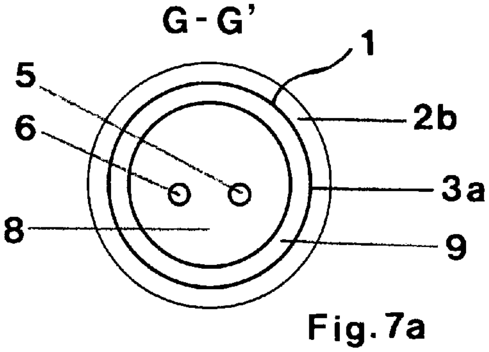

FIG. 7*a* shows the cross-section G–G' from FIG. 7 with the mineral-insulated conduit 1, the longitudinal fluting 3*a*, and the sensor housing 2*b*. The mineral-insulated conduit 1 has two electrical conductors 5, 6, which are arranged insulated from the metallic sheathed tube 9 by a mineral filling powder 8.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A connection arrangement for a mineral-insulated conduit to at least one tube-shaped structure, comprising at least one end of two ends of the mineral-insulated conduit arranged partially overlapping with the tube-shaped structure and affixed thereto by welding or soldering, the connection arrangement having a sheath surface with a raised structure in a region of the overlap, wherein the at least one end of the mineral-insulated conduit and the tube-shaped structure contact each other on all sides in the region of the overlap, and wherein a contact surface is smaller than the sheath surface.

2. The connection arrangement for a mineral-insulated conduit according to claim 1, wherein the at least one end of the mineral-insulated conduit is plugged into the tube-shaped structure.

3. The connection arrangement for a mineral-insulated conduit according to claim 1, wherein the tube-shaped structure is a sensor housing or a connection sleeve.

4. The connection arrangement for a mineral-insulated conduit according to claim 1, wherein the structured sheath surface is formed from an outer peripheral surface of the at least one end of the mineral-insulated conduit.

5. The connection arrangement for a mineral-insulated conduit according to claim 1, wherein the structured sheath surface is formed from an inner peripheral surface of the tube-shaped structure.

6. The connection arrangement for a mineral-insulated conduit according to claim 1, wherein the structured sheath surface comprises a fluting.

7. The connection arrangement for a mineral-insulated conduit according to claim 6, wherein the fluting has a form of a longitudinal fluting.

8. The connection arrangement for a mineral-insulated conduit according to claim 6, wherein the fluting has a form of a transverse fluting.

9. The connection arrangement for a mineral-insulated conduit according to claim 6, wherein the fluting has a form of a diagonal fluting or threading.

10. The connection arrangement for a mineral-insulated conduit according to claim 6, wherein the fluting has a form of a point-shaped fluting.

11. The connection arrangement for a mineral-insulated conduit according to claim 1, wherein the structured sheath surface comprises a wire or a wire mesh.

12. The connection arrangement according to claim 1, wherein the mineral-insulated conduit and the at least one tube-shaped structure are components of a sensor arrangement in a motor vehicle.

* * * * *